UNITED STATES PATENT OFFICE.

HERMANN SEYBERTH AND MORITZ VON GALLOIS, OF HÖCHST-ON-THE-MAIN, GERMANY, ASSIGNORS TO THE FARBWERKE, VORMALS MEISTER, LUCIUS & BRÜNING, OF SAME PLACE.

PROCESS OF PRODUCING DIAZONAPHTHALENE ON FIBER.

SPECIFICATION forming part of Letters Patent No. 595,894, dated December 21, 1897.

Application filed February 12, 1897. Serial No. 623,179. (No specimens.)

*To all whom it may concern:*

Be it known that we, HERMANN SEYBERTH, doctor of philosophy, a citizen of the Empire of Germany, and MORITZ VON GALLOIS, a citizen of the Empire of Austria, both residing at Höchst-on-the-Main, Germany, have invented certain new and useful Improvements in Processes of Producing Diazonaphthalene for the Production of a Claret-Red Color on Fiber, of which the following is a specification.

Among the materials suitable for the production of insoluble azo dyestuffs on fiber alpha-naphthylamin has been hitherto the most important and was employed on account of the great beauty, fastness, and cheapness of the claret color produced on the fiber by the combination of beta-naphthol and alpha-naphthylamin. The introduction of this azo color to dyers and printers met at first with considerable difficulty, which is not yet entirely overcome. Apart from the easy decomposition of the diazo compound the very manufacture of this intermediate product encounters great difficulties. To produce the diazo compound of alpha-naphthylamin, the latter is, for the formation of the hydrochlorate, brought into solution with the requisite quantity of hydrochloric acid. The hydrochlorate thus obtained is precipitated in the form of a fine paste by the addition of an excess of hydrochloric acid, requisite for diazotation, and ice for cooling. By the addition of a nitrite solution the hydrochlorate obtained can only be quantitatively transformed into the diazo compound when it is separated in the form of very fine crystals. The manufacture of the hydrochlorate in this finely-divided and easily-diazotizable state creates considerable difficulty to the dyer and printer, as the slightest mistake on the part of the workman—for instance, in the quantity of acid to be added on forming the hydrochlorate or in the mixing of the hydrochlorate solution with acid and ice—will lead to a badly-diazotizable hydrochlorate paste, the diazo solution of which produces poor results on the fiber, while it is also quite unstable. To provide against these drawbacks, the manufacturers of alpha-naphthylamin supplied to dyers and printers the hydrochlorate obtained, as already stated, by precipitating the solution; but here it was found that by keeping this paste for some time it changed into rough crystals, and consequently into a totally-useless form, an incident which may easily happen to the naphthylamin-hydrochlorate paste, which, moreover, becomes decomposed by the influence of light and air and is therefore useless. To obviate these disadvantages of the paste, an attempt was made to grind the hydrochlorate and to supply it to the dyers and printers in a solid state. This attempt, however, failed, as the hydrochlorate was liable to coagulate, and consequently gave bad results when diazotized. Dyers and printers returned, therefore, to the use of the paste or free base in spite of its accompanying drawbacks.

We have discovered that alpha-naphthylamin may be obtained in a stable form and fit for diazotation without the above-mentioned inconveniences by transforming the base into the sulfate and reducing the latter to a fine powder. The alpha-naphthylamin sulfate may easily be ground to a fine pulverized mass without fear of coagulation and be then kept for a length of time. All the dyer or printer needs to do is to stir the dry powder in water to a paste, without any special precautions to be observed on his part. This paste is quantitatively diazotizable on addition of ice and nitrite, and gives the best results, so that an insoluble azo dyestuff which effects a claret-red color on the fiber is produced, and thereby the drawbacks incidental to the former-described process of dyeing on the fiber are obviated. Alpha-naphthylamin in this stable and suitable form for diazotation is manufactured by transforming the base into its sulfate and reducing the latter, after carefully drying, into powder form by means of a suitable grinding-mill. The pulverized alpha-naphthylamin sulfate thus obtained is a white dry powder.

Having thus described our invention, we claim as new and desire to secure by Letters Patent—

The process herein described of producing diazonaphthalene for the production of a claret-red color on the fiber, which consists in stirring pulverized alpha-naphthylamin sulfate in water, applying the pasty solution to the fiber, and then diazotizing the same, substantially as set forth.

In testimony that we claim the foregoing as our invention we have signed our names in presence of two subscribing witnesses.

HERMANN SEYBERTH.
MORITZ VON GALLOIS.

Witnesses:
HEINRICH HAHN,
ALFRED BRISBOIS.